UNITED STATES PATENT OFFICE.

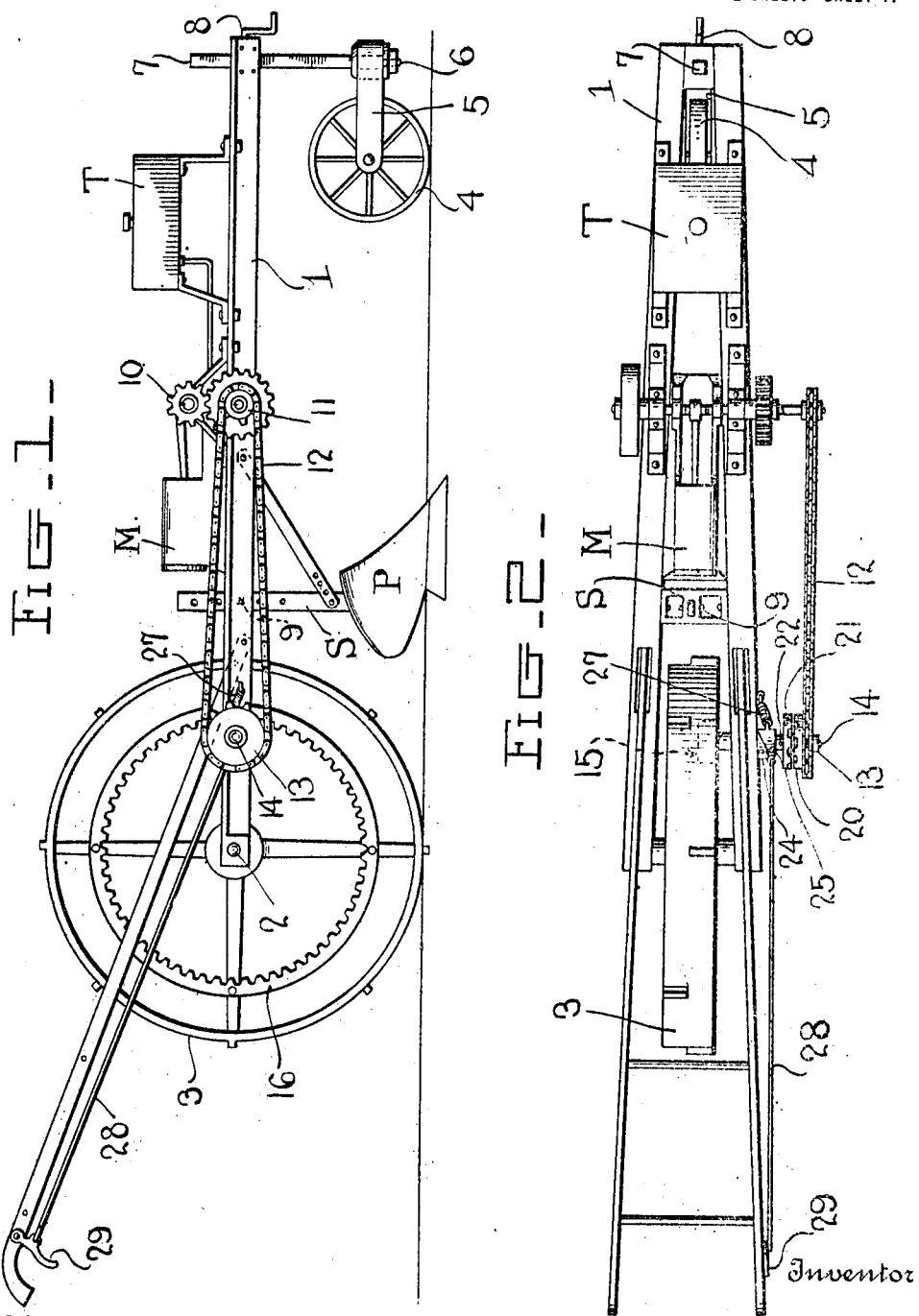

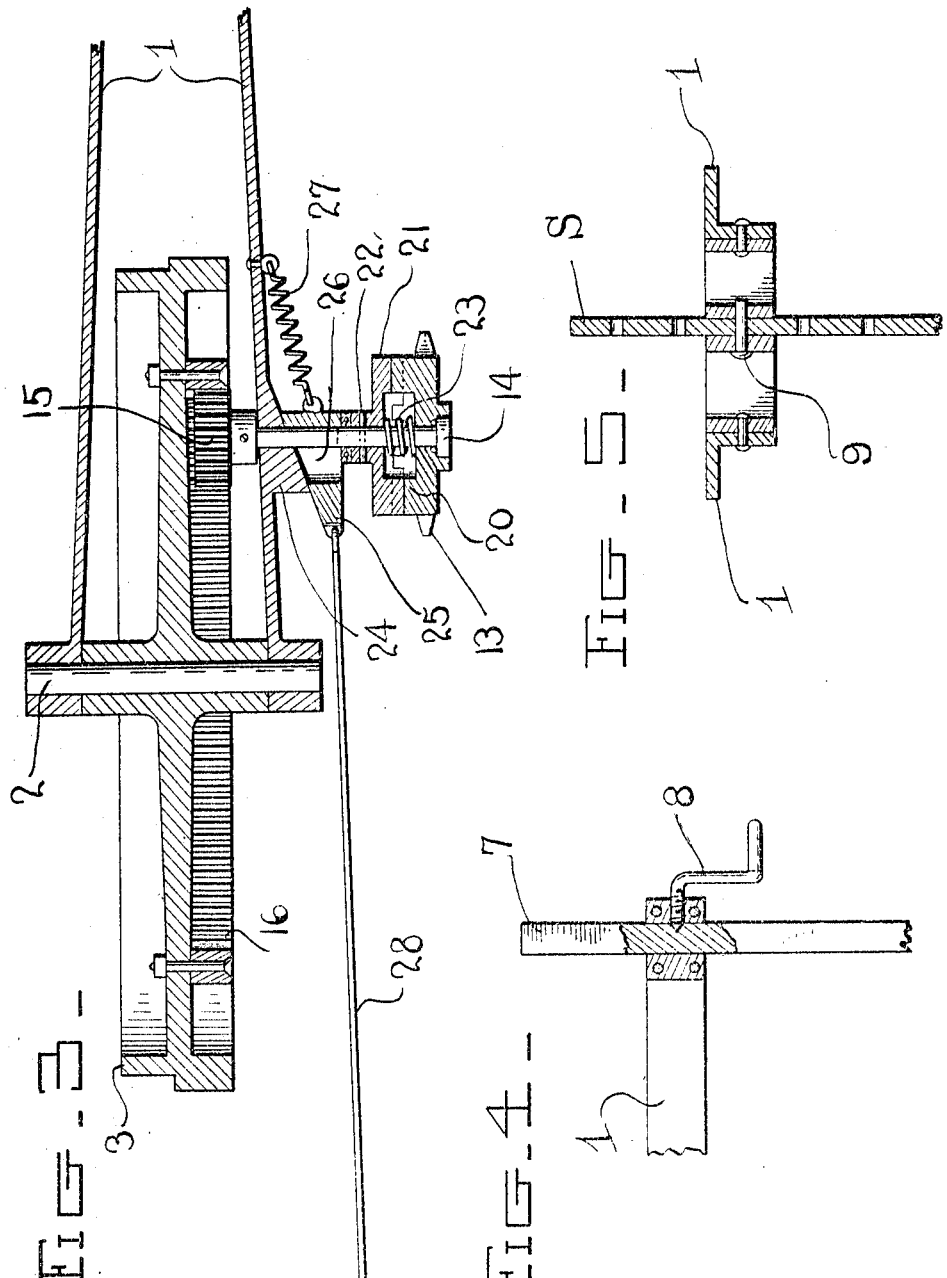

ROYAL L. McCUNE, OF VERO, FLORIDA.

AGRICULTURAL IMPLEMENT.

1,270,180.　　　　Specification of Letters Patent.　　Patented June 18, 1918.

Application filed October 20, 1917. Serial No. 197,697.

*To all whom it may concern:*

Be it known that I, ROYAL L. MCCUNE, a citizen of the United States, residing at Vero, in the county of St. Lucie and State of Florida, have invented new and useful Improvements in Agricultural Implements, of which the following is a specification.

This invention is primarily a motor-driven plow or cultivator intended for use on a small garden, although of course it could be amplified to have greater utility, and it is quite possible that a drill or other seeding attachment might be applied and used. Specifically the invention lies in the details of the clutch for automatically throwing the driving mechanism out of connection with the main wheel to stop the progress of the machine in case the operator should release his grip on the handle accidentally or purposely.

Details are set forth in the following specification and claims, and shown in the accompanying drawings wherein:—

Figure 1 is a side elevation of this machine complete.

Fig. 2 is a plan view.

Fig. 3 is an enlarged horizontal section through the driving and driven clutch elements and the gears connecting the counter-shaft with the bull or main wheel, showing the parts of the clutch-operating mechanism in a different position from that in Fig. 2.

Figs. 4 and 5 are details respectively of means for adjusting the caster wheel and the plow or other standards.

The frame 1 of this machine comprises side bars diverging from the front toward the rear and there connected by a main axle 2 on which between the side bars is rigidly mounted a wide-tread main wheel 3 of considerable size. The front end of the same is supported by a caster wheel 4 journaled between the arms of a fork 5, standing horizontal and pivoted at its front end at 6 to the lower end of an upright standard 7 which is adjustable vertically through the frame under the tip of a set screw 8. By this means it is obvious that by loosening the set screw and adjusting the standard the caster wheel may be set higher or lower and therefore the front of the frame caused to travel lower or higher respectively with respect to the ground. The agricultural implement, herein shown as a plow P, also has its standard S rising through an upright hole in the frame at a proper point therein, and adjusted by means of a pin or other device 9 whereby the plow standard may be set to cause it to travel at the desired distance beneath the surface of the earth; by preference I use a brace connecting the frame with the standard as shown.

The letter M designates a motor herein shown as a gasolene engine which I preferably employ, and the gasolene is supplied from a tank T carried by brackets which elevate it above the frame so that it will flow readily to the motor. A small motor will usually suffice, but the details need not be elaborated. The main or crank shaft is herein shown as connected by gearing 10 with a sprocket wheel 11 which is connected by a chain 12 extending alongside the frame to another sprocket wheel 13 mounted loosely on the outer end of a counter-shaft 14 which latter is journaled in bearings in one side bar of the frame. At the inner end of the shaft is a pinion 15 herein shown as meshing with internal teeth in a gear ring 16 fastened to the main or bull wheel 3. However it is obvious that a shaft drive might be used for communicating power from the engine to the driving gear, and it is obvious that an internal toothed ring on the main wheel is not absolutely necessary as the counter-shaft might be fixed through the main wheel and become the shaft thereof. When the power sprocket 13 is connected to the counter shaft, the main wheel will be rotated and the entire plow driven over the ground; and the means for connecting these elements and disconnecting them at the will of the operator will now be described.

The sprocket 13 is formed on the hub of a clutch member 20, and adjacent the latter there is a second clutch member 21 whose hub is splined at 22 on the counter shaft 14. These members have clutch teeth projecting toward each other and an interposed expansive spring 23 coiled on the shaft throws the teeth normally out of engagement with each other. Held by the frame and surrounding the shaft 14 is a wedge 24, and a second wedge 25 is movably mounted on the same shaft by means of a longitudinal slot 26 through its body. A spring 27 connects the last-named wedge 25 with a point on the frame, whereas a rod 28 leads from its smaller rear end backward to a thumb latch 29 on a handle within reach of the operator's right hand. The movable wedge 25 stands between the fixed wedge 24 and the inner end of the hub of the movable clutch member, and normally it is drawn forward by the spring 27 so that the expansive coiled spring 23 will move said driven clutch member inward on the shaft 14 and throw it out of engagement with the power clutch member. Now when the operator manipulates the thumb latch 29, the rod 28 draws the wedge 25 to the rear, its slot 26 sliding over the shaft 14, and the beveled faces of the two wedges cause the movable wedge to slide outward on the shaft 14 so that the driven clutch member is projected outward and its teeth engaged with the power clutch member; but as soon as the operator releases pressure on the thumb-latch 29, accidentally or purposely, the spring 27 draws the movable wedge forward and the expansive spring 23 disengages the clutch member. It will hardly be necessary to illustrate and describe the motor-control thumb latch or lever, preferably mounted adjacent the other handle and connected with the throttle of the motor M in the usual manner, but that thumb lever will not need the constant attention of the driver because once having set the motor he will probably not care to change it or stop it very often. However, should he slip as he follows the machine in steering the plow, or should the plow or other implement strike a stone or a snag, it becomes highly desirable that the forward progress of the machine be checked immediately, while it is not desirable that the running of the motor shall cease. All the operator has to do is to release the right-hand handle, or at least to loosen his grip thereon to such an extent that the thumb latch 29 may move, and the clutch opens automatically and driving power from the motor end to the main wheel 3 is cut off. If the machine be provided with only one caster wheel and one main wheel, as I prefer, it is essential that the driver hold the handles quite rigidly so that at all times he may maintain the upright position of the machine as well as guide it along its course, and therefore it is no hardship for him to keep his hand upon the handle which carries the thumb latch 29 as shown. The parts are of the desired proportions and materials, and changes in details may be made without departing from the spirit of the invention.

What I claim as new is:—

1. In an agricultural implement, the combination with the frame carrying said implement and having a caster wheel at its front and a driving wheel at its rear, and a motor mounted on said frame; of a counter-shaft journaled in the frame and connected with the driving wheel, a power clutch element fast on said shaft and driven by the motor, a driven clutch element splined on said shaft, yielding means holding it normally out of engagement with the power element, fast and loose wedges for sliding it into such engagement, a thumb-latch on one of the machine handles, and connections between said latch and the loose wedge.

2. In a motor driven agricultural implement whose driving wheel is connected with a counter-shaft, the combination with a power clutch element loose on said shaft and connected with the motor, a second clutch element splined on said shaft, yielding means between the elements for holding them normally out of engagement, a wedge fast on the frame, a second wedge having a slot slidably mounted on the counter-shaft between the first wedge and the hub of the driven clutch element, a spring drawing the movable wedge normally forward to permit the expansive spring to disengage said clutch elements, a thumb latch adjacent one of the machine handles, and a rod connecting the movable wedge with said thumb latch.

In testimony whereof I affix my signature.

ROYAL L. McCUNE.